US006323789B1

(12) United States Patent
Lawrence

(10) Patent No.: US 6,323,789 B1
(45) Date of Patent: Nov. 27, 2001

(54) METHOD AND APPARATUS FOR COMBINING A PLURALITY OF 8B/10B ENCODED DATA STREAMS

(75) Inventor: Peter H. Lawrence, Smyrna, GA (US)

(73) Assignee: Georgia Tech Research Corporation, Alanta, GA (US)

(*) Notice: Subject to any disclaimer, the term of this patent is extended or adjusted under 35 U.S.C. 154(b) by 0 days.

(21) Appl. No.: 09/638,717

(22) Filed: Aug. 14, 2000

Related U.S. Application Data

(60) Provisional application No. 60/149,076, filed on Aug. 16, 1999.

(51) Int. Cl.[7] .................................................... H03M 7/20
(52) U.S. Cl. ................................ 341/102; 341/58; 341/50
(58) Field of Search ...................... 341/100, 101, 341/50, 58, 59, 102

(56) References Cited

U.S. PATENT DOCUMENTS

| 4,486,739 | 12/1984 | Franaszek et al. | 340/347 |
|---|---|---|---|
| 4,598,267 | * 7/1986 | Fukuda | 340/347 |
| 5,592,160 | * 1/1997 | Bennett et al. | 341/58 |
| 5,648,776 | 7/1997 | Widmer | 341/100 |
| 5,675,584 | 10/1997 | Jeong | 370/284 |
| 5,818,846 | 10/1998 | Mori et al. | 370/532 |
| 5,835,498 | 11/1998 | Kim et al. | 370/537 |
| 6,184,808 | * 2/2001 | Nakamura | 341/95 |

* cited by examiner

Primary Examiner—Peguy JeanPierre
(74) Attorney, Agent, or Firm—Thomas, Kayden, Horstemeyer & Risley LLP

(57) ABSTRACT

A method and apparatus for combining a plurality of 8B/10B encoded DVB-ASI input streams into an aggregate output data stream allows a receiving device to synchronize to the aggregate output data stream by mapping a synchronization character to a unique character if the synchronization character occurs in a first timeslot of the aggregate output data stream. This unique character allows a receiving device to synchronize to the aggregate output data stream. If the synchronization character occurs in a timeslot other than the first timeslot, the synchronization character is mapped to another special character that denotes that no data is present in the timeslot. In addition, if the synchronization character occurs in a timeslot after the last timeslot in which data may be placed in the aggregate output data stream, the synchronization character can be mapped to yet another special character denoting that no data is available in the timeslot.

28 Claims, 7 Drawing Sheets

METHOD AND APPARATUS FOR COMBINING A PLURALITY OF 8B/10B ENCODED DATA STREAMS

CROSS-REFERENCE TO RELATED APPLICATIONS

This document claims priority to and the benefit of the filing date of U.S. Provisional Patent Application entitled "METHOD OF MULTIPLEXING SEVERAL 8B/10B CODED INPUT STREAMS ONTO A SINGLE HIGHER RATE 8B/10B OUTPUT STREAM," assigned Ser. No. 60/149,076, and filed Aug. 16, 1999, the text of which is hereby incorporated by reference.

TECHNICAL FIELD

The present invention relates generally to the delivery of digital video using digital video broadcast-asynchronous serial interface (DVB-ASI), and, more particularly, to a method and apparatus for combining a plurality of 8 bit to 10 bit (8B/10B) encoded DVB-ASI transport streams into a higher rate aggregate transport stream.

BACKGROUND OF THE INVENTION

There are many ways to deliver digital video signals to a subscriber. For example, compressed digital video using the motion picture experts' group (MPEG-2) compression/decompression methodology can be delivered using a variety of media including coaxial cable, fiber optic cable and satellite. Some of these delivery systems are considered "video-on-demand," or "near video-on-demand" in that a user, or subscriber, may select from a plurality of offerings and view a particular program as desired from time to time. In video-on-demand systems a user may select a program for viewing at any arbitrary time. In near video-on-demand systems, a user is typically given a choice of programming available at repeated specific times. Furthermore, broadcast video applies to programming that occurs with a daily or weekly schedule and is delivered to a wide number of subscribers at the same time.

The video programming can be delivered to a receiver via a number of methodologies, for example but not limited to, satellite, cable, fiber optic technology, etc. After receipt of the programming source content, these systems can use coaxial or fiber optic cabling technology to deliver the video programming received by a digital receiver to the MPEG-2 digital video broadcast (DVB) equipment using the DVB-ASI communication standard. DVB-ASI is a communication standard based on MPEG-2 that specifies the manner in which MPEG-2 data are transmitted via coaxial or fiber optic cabling.

The DVB-ASI interface uses what is referred to as an 8 bit to 10 bit (8B/10B) encoding scheme in which each byte (8 bits) of data is encoded into a 10-bit data word. There are $2^8$ (256) possible characters that can be represented with 8 bits and there are $2^{10}$ (1024) possible characters that can be represented with 10 bits. In this manner an 8B/10B encoder utilizes a specially chosen 256-member subset of the 1024 possible characters to represent each 8-bit data byte. Such a system is described in U.S. Pat. No. 4,486,739 to Franaszek et al., entitled "BYTE ORIENTED DC BALANCED (0,4) 8B/10B PARTITIONED BLOCK TRANSMISSION CODE," and issued on Dec. 4, 1984. This system defines special 10 bit characters to be utilized that have no direct current (DC) bias and which have frequent bit transitions, two characteristics that are desirable in a serial communications link such as DVB-ASI.

Because only 256 out of a possible 1024 characters are used to represent each byte of data in a DVB-ASI data stream, there are numerous code characters to spare. Such a system enables some of the 10 bit characters to be coded differently from those that are used to represent an 8-bit data byte in a DVB-ASI data stream. These special characters can be utilized to perform user-defined functionality, and a subset of these special characters, known as comma characters, enable a receiver to synchronize to the coded serial data stream. These special characters can also be used to communicate to the receiver that there were no data present in a particular byte in the data stream. The DVB-ASI protocol dictates that one of these comma characters, specifically the character designated K28.5, be periodically inserted into the data stream to allow a receiver the opportunity to synchronize to the input data stream.

The DVB-ASI standard allows up to approximately 213 Mbps data rate. It would be desirable to have a way in which to combine a number of these 8B/10B encoded DVB-ASI data streams into an aggregate higher speed 8B/10B encoded data stream for transport over a fiber connection. However, there must be some defined way of separating this higher speed 8B/10B encoded data stream back into its individual DVB-ASI components.

Therefore, there is a need in the industry for a manner in which to combine a number of 8B/10B encoded DVB-ASI data streams into an aggregate higher speed 8B/10B encoded data stream for transport over a fiber connection while allowing a receiving device to reliably synchronize to and separate the aggregate 8B/10B encoded data stream into the individual 8B/10B encoded DVB-ASI data streams.

SUMMARY OF THE INVENTION

The present invention provides a method and apparatus for combining a number of 8B/10B encoded DVB-ASI data streams into an aggregate higher speed 8B/10B encoded data stream for transport over a fiber connection while allowing a receiving device to reliably synchronize to and separate the aggregate 8B/10B encoded data stream into the individual 8B/10B encoded DVB-ASI data streams.

In one aspect, the present invention can be viewed as a method for combining a plurality of data streams into an aggregate data stream, the method comprising the steps of encoding a first plurality of 8 bit data words from a first data stream into a first plurality of corresponding 10 bit data words in which each 10 bit data word represents a respective 8 bit data word from the first data stream, and encoding a second plurality of 8 bit data words from a second data stream into a second plurality of corresponding 10 bit data words in which each 10 bit data word represents a respective 8 bit data word from the second data stream. The method also includes the steps of combining the first plurality of corresponding 10 bit data words and the second plurality of corresponding 10 bit data words into an aggregate output stream, which is divided into a plurality of timeslots, encoding a plurality of 10 bit words into a corresponding plurality of special characters that do not correspond to any of the first or second plurality of 8 bit data words, periodically inserting the special characters into the aggregate output stream, and inserting a first special character into a first of the plurality of timeslots, the first special character allowing a receiver to synchronize to the aggregate output stream.

Architecturally, the invention is an apparatus for combining a plurality of data streams into an aggregate data stream, comprising an encoder for combining a first plurality of 10 bit data words and a second plurality of 10 bit data words into an aggregate output stream, the aggregate output stream divided into a plurality of timeslots. The encoder is also configured to encode a second plurality of 10 bit words into a corresponding plurality of special characters that do not correspond to any of the first or second plurality of 10 bit data words. The encoder also periodically inserts the special characters into the aggregate output stream, and also inserts a first special character into a first of the plurality of timeslots, the first special character allowing a receiver to synchronize to the aggregate output stream.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
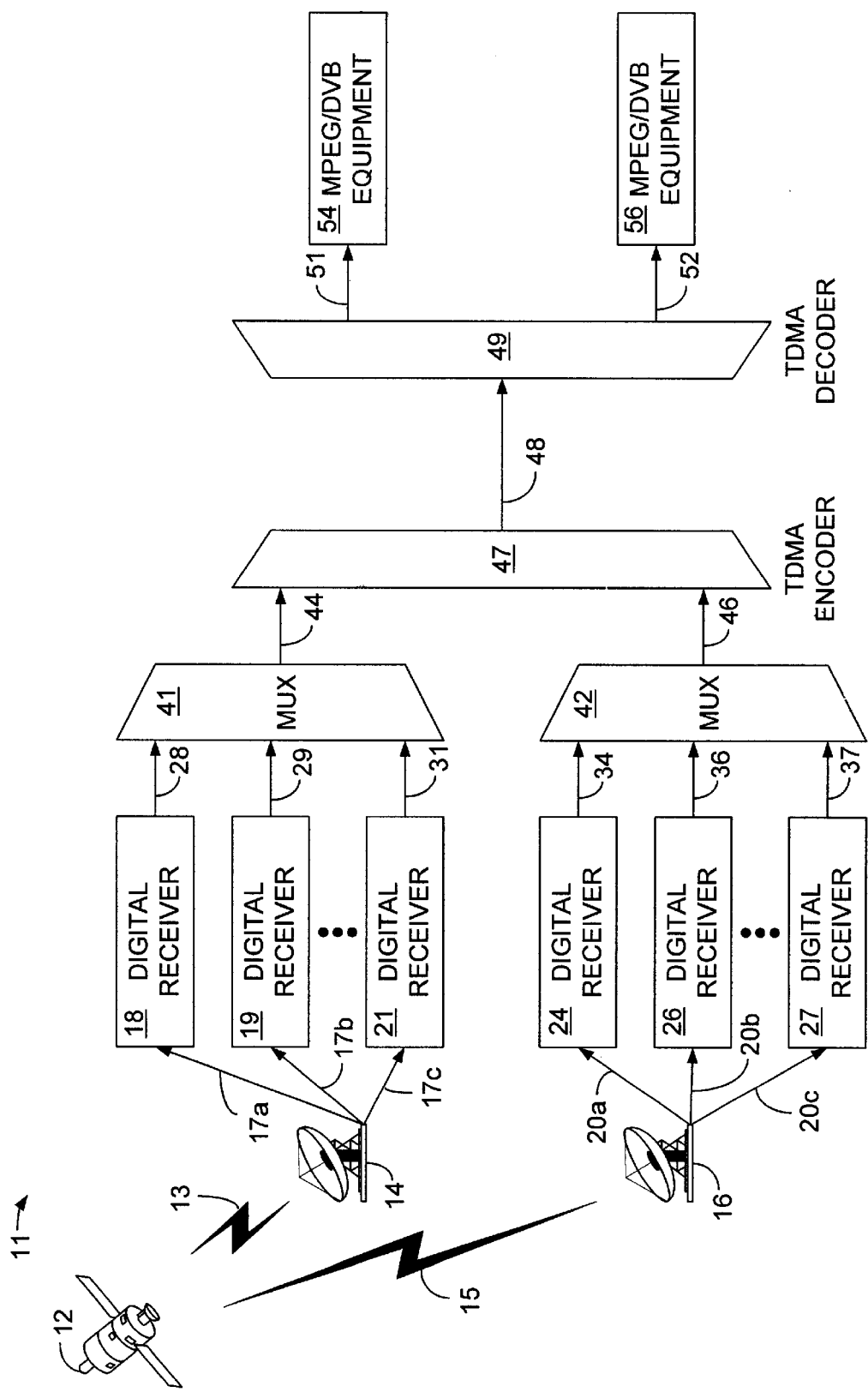
FIG. 1 is a block diagram illustrating the communication environment in which the encoder and decoder of the present invention reside.

The method and apparatus for combining a plurality of 8B/10B encoded DVB-ASI transport streams into a higher rate aggregate transport stream of the present invention can be implemented in hardware, software, firmware, or a combination thereof. In the preferred embodiment(s), the method and apparatus for combining a plurality of 8B/10B encoded DVB-ASI transport streams into a higher rate aggregate transport stream is implemented in hardware that is managed by software or firmware that is stored in a memory and that is executed by a suitable instruction execution system.

The software portion can be stored in a memory and be executed by a suitable instruction execution system (microprocessor). The hardware implementation of the method and apparatus for combining a plurality of 8B/10B encoded DVB-ASI transport streams into a higher rate aggregate transport stream can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the method and apparatus for combining a plurality of 8B/10B encoded DVB-ASI transport streams into a higher rate aggregate transport stream software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed. The program can be electronically captured, via for instance optical scanning of the paper or other medium, then compiled, interpreted or otherwise processed in a suitable manner if necessary, and then stored in a computer memory.

Turning now to the drawings, FIG. 1 is a block diagram illustrating the communication environment 11 in which the encoder and decoder of the present invention reside. In communication environment 11, satellite 12 delivers video programming content via downlinks 13 and 15 to earth stations 14 and 16, respectively. In accordance with known broadcast techniques, the digital video content sent from satellite 12 is decoded and forwarded by earth stations 14 and 16 to digital receivers for further distribution. For example, the digital video content is supplied from earth station 14 via connections 17a, 17b and 17c to digital receivers 18, 19 and 21, respectively. Similarly, the digital video content received by earth station 16 is forwarded via connections 20a, 20b and 20c to digital receivers 24, 26 and 27, respectively. Although shown using three (3) digital receivers for each earth station, it is contemplated that an arbitrary number of digital receivers will be used.

Digital receivers 18, 19 and 21 forward the digital video information via connections 28, 29 and 31, respectively, to multiplexer 41. Connections 28, 29 and 31 can also be DVB-ASI communication channels. Multiplexer 41 can be any device capable of multiplexing the digital video content on connections 28, 29 and 31 to supply an 8B/10B encoded DVB-ASI data stream via connection 44.

Similarly, digital receivers 24, 26 and 27 supply the digital video content received from earth station 16 via connections 34, 36 and 37, which can also be DVB-ASI communication channels, to multiplexer 42. Multiplexer 42 is similar to multiplexer 41 in that it supplies an 8B/10B encoded DVB-ASI data stream via connection 46. The 8B/10B encoded DVB-ASI data streams on connections 44 and 46 are encoded as described in the DVB DOCUMENT A010 rev.1 "Interfaces for CATV/SMATV Headends and Similar Professional Equipment," which in turn employs the 8B/10B encoding scheme described in the above-mentioned U.S. Pat. No. 4,486,739. The 8B/10B encoded DVB-ASI data streams on connections 44 and 46 are considered the input streams to the 8B/10B time domain multiple access (TDMA) encoder 47. The discussion of FIG. 1 will be completed following a brief explanation on the operation of an 8B/10B encoder.

Figure 2:
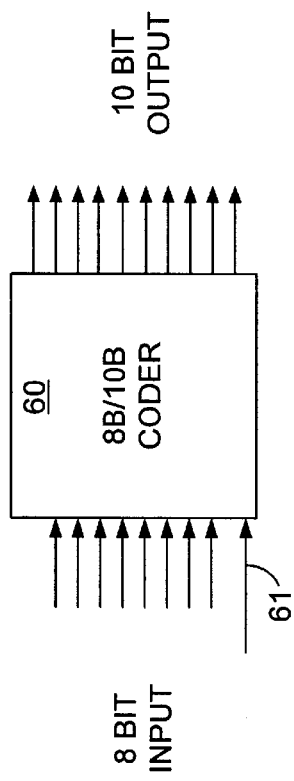
FIG. 2 is a block diagram illustrating the 8 bit to 10 bit (8B/10B) encoder used to form the 8B/10B DVB-ASI input data streams of FIG. 1.

FIG. 2 is a block diagram illustrating the 8 bit to 10 bit (8B/10B) coder 60 used to form the 8B/10B DVB-ASI input data stream on connections 44 and 46 of FIG. 1. As shown in FIG. 2, an 8-bit data word is input to 8B/10B coder 60. The 8 bit word is encoded into a 10 bit data word and supplied as output of 8B/10B coder 60. A control signal(s) applied to coder 60 via connection 61 allows a special purpose 10 bit character to be output instead of a 10 bit character that represents the 8 bit input.

Figure 3:
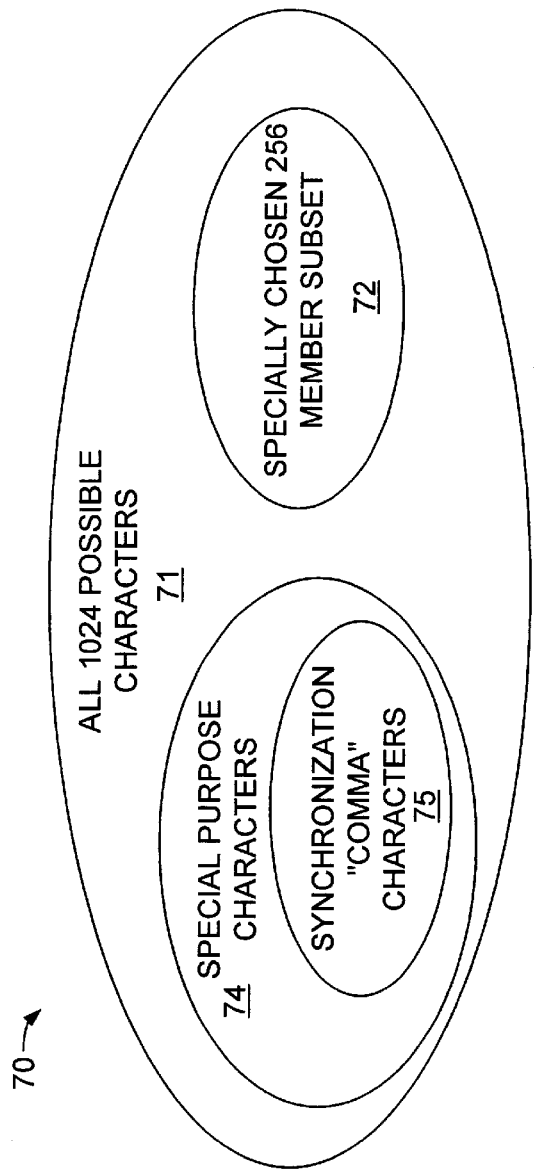
FIG. 3 is a graphical illustration representing the operation of the 8B/10B coder of FIG. 2.

FIG. 3 is a graphical illustration 70 representing the operation of the 8B/10B coder 60 of FIG. 2. The space enclosed by ellipse 71 represents all of the 1,024 possible characters that can be encoded using 10 bits. The ellipse 72 represents the 256 member subset of the set 71 that is used to encode the 8 bit input to 8B/10B coder 60 of FIG. 2. The ellipse 74 represents the special character subset, which is a subset of all the possible characters represented by ellipse 71 and not included in the 256 member subset 72 used to encode the 8 bit data words input to coder 60 of FIG. 2. Within this special character subset, there is another subset of characters, represented by ellipse 75. The characters represented by ellipse 75 have special properties that allow receivers to synchronize to the decoded bit stream. These synchronization characters are referred to as comma characters and are denoted as K28.1, K28.5, and K28.7. As will be discussed below, these comma characters are introduced into the aggregate output data stream 48 (of FIG. 1) when there are no data to be sent. When these comma characters periodically appear in the aggregate output data stream, a receiving device has repeated opportunities to synchronize to the input data stream.

Referring back to FIG. 1, the 8B/10B encoded DVB-ASI input data streams on connections 44 and 46 are supplied to 8B/10B TDMA encoder 47. The TDMA encoder 47, in accordance with an aspect of the invention, combines the individual 8B/10B DVB-ASI input streams on connections 44 and 46 and supplies an aggregate output data stream on connection 48.

The aggregate output data stream on connection 48 is supplied to 8B/10B TDMA decoder 49, which, in accordance with an aspect of the invention, decodes the aggregate output data stream on connection 48 and supplies decoded individual 8B/10B encoded DVB-ASI streams on connections 51 and 52 to MPEG/DVB equipment 54 and 56, respectively. It should be noted that although shown using two 8B/10B encoded DVB-ASI streams (connections 44 and 46) it is anticipated that many more input data streams will be implemented using the concepts of the invention. The data streams 51 and 52 output from 8B/10B TDMA decoder 49 correspond, respectively, to the 8B/10B DVB-ASI encoded input data streams 44 and 46 input to 8B/10B TDMA encoder 47. Although only two input data streams are shown in FIG. 1, it is possible to combine multiple input data streams (i.e., up to n data streams) into the aggregate output data stream over connection 48.

Figure 4:
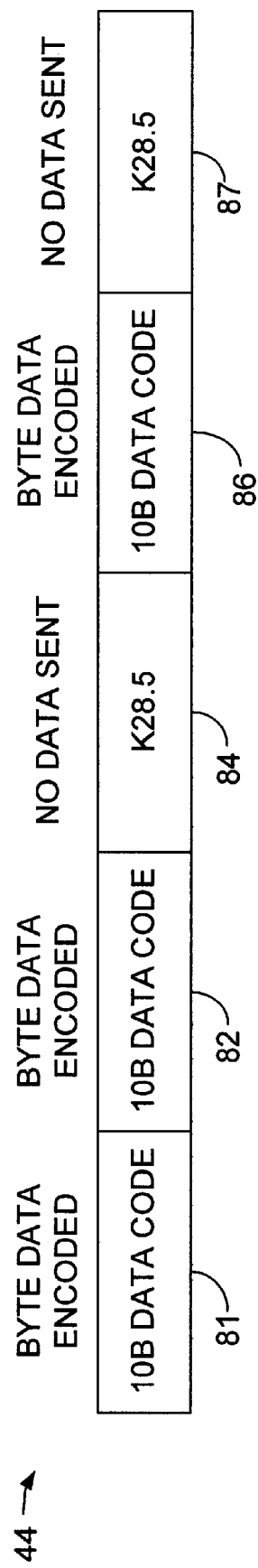
FIG. 4 is a graphical representation illustrating one of the 8B/10B DVB-ASI encoded data streams of FIG. 1.

FIG. 4 is a graphical representation illustrating the 8B/10B encoded DVB-ASI data stream on connection 44 of FIG. 1. As shown, a 10 bit encoded data word 81 that represents one byte (8 bits) of encoded data is followed by another 10 bit encoded data word 82 containing another byte of encoded data. The 10 bit data word 82 is followed by a synchronization character 84 containing the K28.5 comma character, indicating that no data were sent in that timeslot. The synchronization character 84 is followed by another 10 bit encoded data word 86 representing another byte of encoded data, which is followed by another synchronization character 87 containing the comma character K28.5 indicating that no data has been sent. In this manner, the insertion of the K28.5 "NODATA" comma character allows a device receiving the aggregate output data stream on connection 48 (FIG. 1) to synchronize to the data stream.

Figure 5:
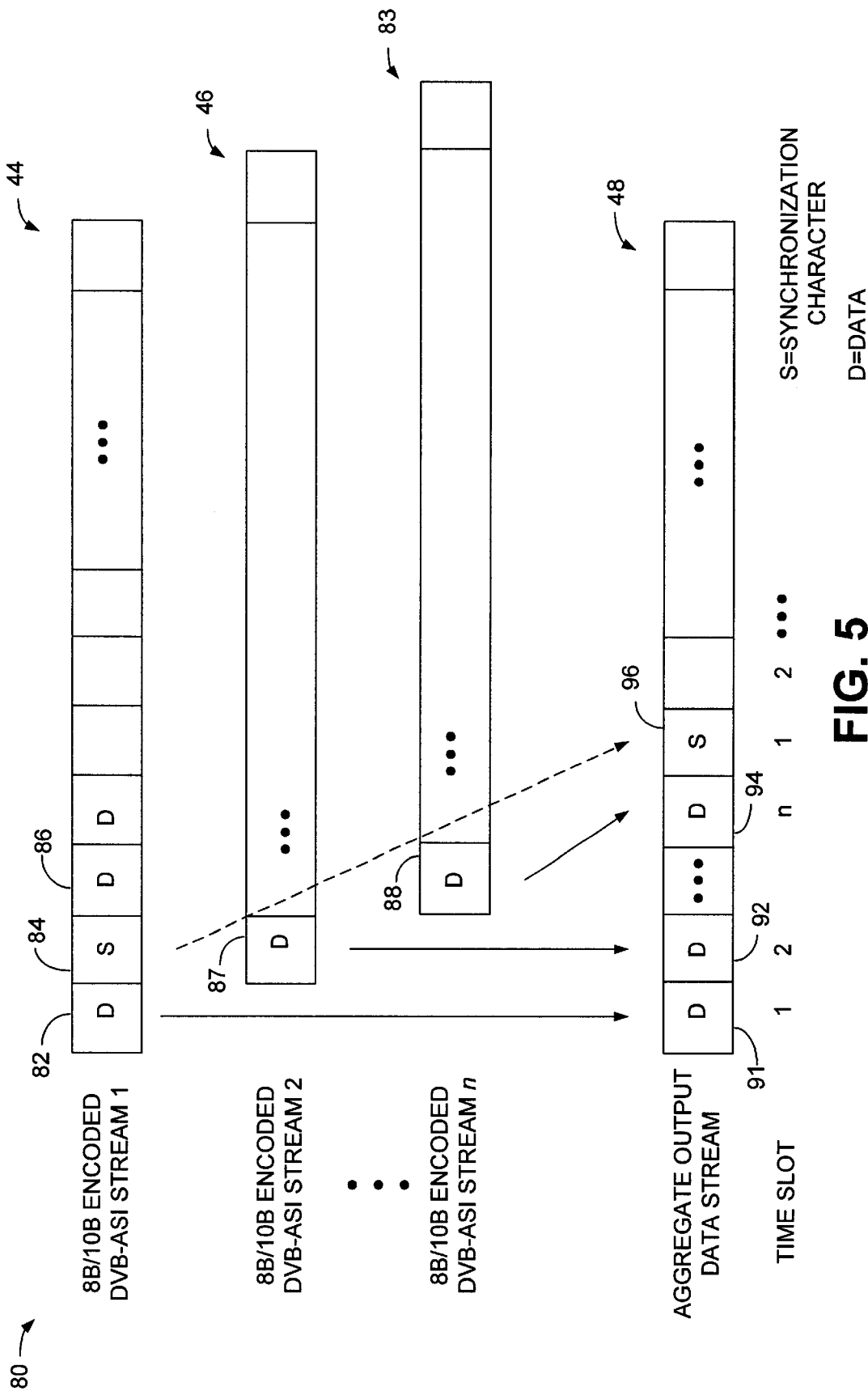
FIG. 5 is a graphical representation illustrating a plurality of 8B/10B DVB-ASI encoded data streams combined into an aggregate output data stream.

FIG. 5 is a graphical representation 80 illustrating a plurality of 8B/10B encoded DVB-ASI data streams combined into an aggregate output data stream. As shown in FIG. 5, each DVB-ASI input stream includes a serial stream of a plurality of 10 bit words. For example, DVB-ASI input data stream 1 44 includes 10 bit words 82, 84 and 86, etc., while DVB-ASI input data stream 2 46 includes a plurality of 10 bit data words, an exemplar one of which is illustrated using reference numeral 87. As shown, the 10 bit data word 82 is placed in timeslot 1 91 of aggregate output data stream 48 and 10 bit data word 87 is placed in timeslot 2 92 of aggregate output data stream 48. Although shown as offset from each other for simplicity of illustration, the 10 bit data words 82 and 87 may arrive simultaneously, in which case there will be some delay in placing one of the 10 bit data words into aggregate output data stream 48.

In addition to data, each DVB-ASI input data stream 44, 46 and 83 periodically includes a K28.5 synchronization comma character, denoted by the letter "S," as described above with respect to FIG. 3 and FIG. 4. In accordance with an aspect of the invention, depending upon the location in the aggregate output data stream 48 in which the comma character S occurs, the comma character S will be mapped to any of a number of special comma characters. The comma character S can be mapped to any of the available comma characters: K28.1, K28.5, or K28.7.

Figure 6:
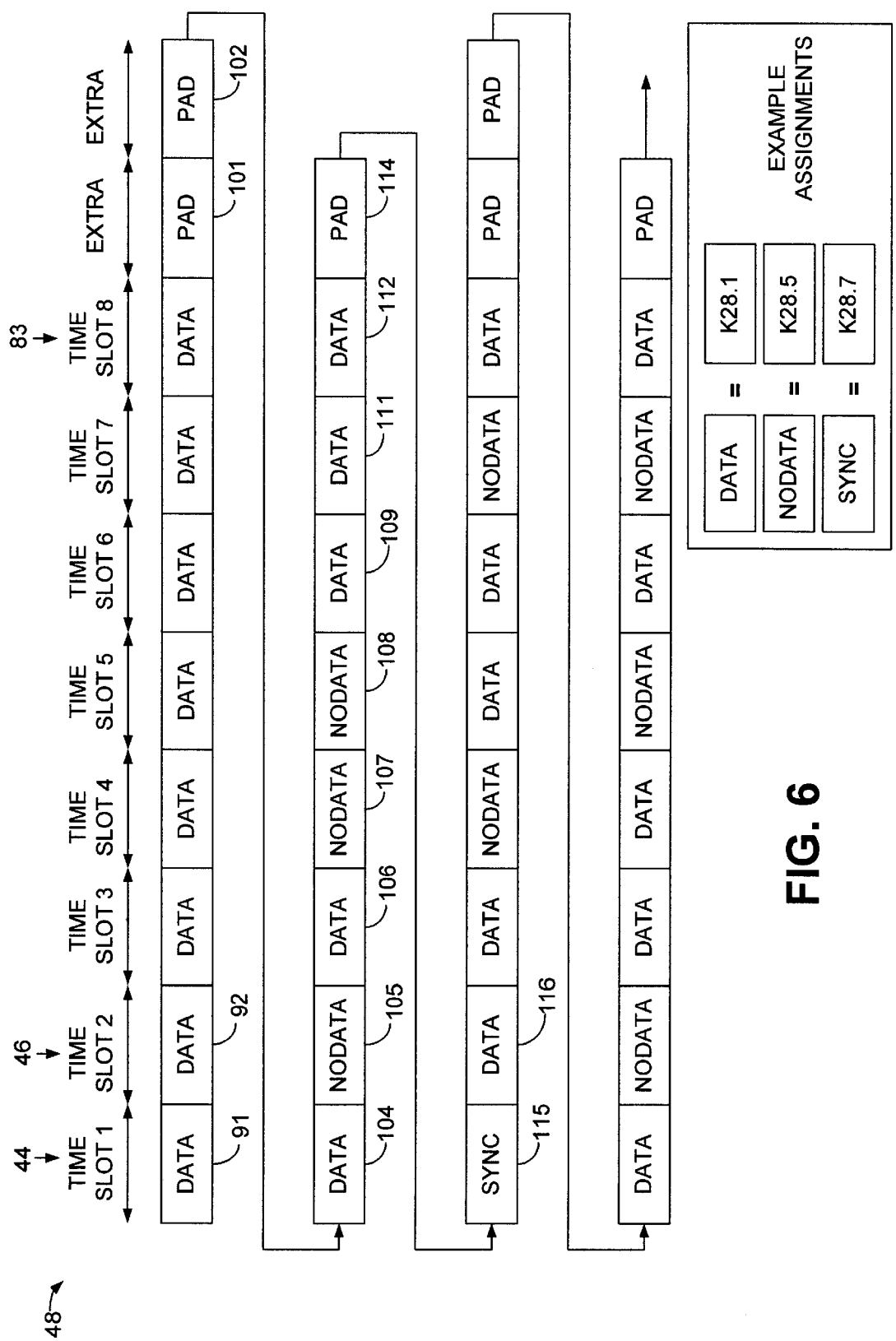
FIG. 6 is a graphical representation illustrating the aggregate output data stream of FIG. 1 and FIG. 5 in accordance with an aspect of the invention.

As will be illustrated in further detail with respect to FIG. 6, if the comma character S appears in timeslot 1 96 of aggregate output data stream 48 (as shown by the comma character S contained in 10 bit data word 84 and placed in timeslot 1 96 of aggregate output data stream 48) it will be mapped to the K28.7 comma character. If the comma character S appears in the middle (i.e., not in a first timeslot of aggregate output data stream 48) then it will be mapped to the K28.5 comma character, and if the comma character S appears in an additional timeslot after the nth timeslot (where n is the number of 8B/10B DVB-ASI encoded input streams) it will be mapped to the K28.1 comma character.

FIG. 6 is a graphical representation illustrating the aggregate output data stream 48 of FIG. 1 and FIG. 5. For illustration purposes, the aggregate output data stream 48 includes eight (8) timeslots. For example, the 8B/10B encoded DVB-ASI input stream on connection 44 (FIG. 1) is arbitrarily assigned timeslot 1 and the 8B/10B encoded DVB-ASI input stream on connection 46 (FIG. 1) is arbitrarily assigned timeslot 2. The remaining 8B/10B encoded DVB-ASI input streams (through n) are assigned the remaining timeslots. The 10-bit data words from the 8B/10B encoded DVB-ASI input data streams 44, 46 and 83 (FIG. 5) are inserted into the aggregate output data stream 48 depending upon their arrival time. Depending upon the location in the aggregate output stream 48 in which the comma character S occurs, the comma character S will be mapped to one of the three comma characters mentioned above with respect to FIG. 5. To illustrate, 10 bit data words 91 and 92 are placed in timeslot 1 and timeslot 2, respectively, of the aggregate output data stream 48 and contain normal 10-bit data words that represent the 8 bits of encoded data as mentioned above. However, as shown in FIG. 6, after timeslot 8 there are two extra timeslots available. This situation can occur if the aggregate output data stream 48 is at a data rate that is not an even multiple of the 8B/10B encoded DVB-ASI input streams. For example, the aggregate output data stream 48 may be at a significantly higher bit rate (such as one or two gigabits per second (Gbps)) that is not an even multiple of the 8B/10B encoded DVB-ASI input streams. Therefore, each of the 8B/10B encoded DVB-ASI input data streams 44 and 46 may not evenly divide into the aggregate output data stream 48, resulting in additional timeslots being available.

In such a case, the K28.1 comma character (hereinafter referred to as a padding "PAD") character is inserted into any timeslots following the nth (in this case 8) timeslot. This is represented by PAD characters 101 and 102 in FIG. 6. When the extra timeslots are filled with the PAD character, data again are inserted into the following timeslots as illustrated by 10 bit data words 104, 106, 109, 111, 112, etc.

If a synchronization character S occurs in the middle of a data stream and within one of the timeslots 2–8, as shown by 10-bit character 105, then it is mapped to the comma character K28.5 illustrating that "NODATA" is available in this timeslot.

In accordance with this aspect of the invention, if the comma character S appears in timeslot 1, as illustrated using the character "SYNC" 115, then the comma character is mapped to the comma character K28.7 and used as a means of synchronization, thereby allowing a receiving device to synchronize to this first timeslot. In this manner, three comma characters are inserted into the aggregate output data stream 48 (depending upon when they occur) so that an 8B/10B TDMA decoder 49 can easily synchronize to the aggregate output data stream 48.

In accordance with this aspect of the invention, a quantity n of 8B/10B encoded DVB-ASI data streams are being multiplexed into a single 8B/10B encoded DVB-ASI aggregate output data stream 48. This output data stream has a data rate equal to or greater than the sum of the data rates. Because each of the inputs conforms to the DVB-ASI specification, each input introduces the "NODATA" character (comma character K28.5) regularly to allow the receiver to synchronize to the data stream. For the timeslot associated with input 1, the character "SYNC" (comma character K28.7) is substituted for the character "NODATA." At a receiving end, the receiving circuitry need only wait for the "SYNC" (K28.7) character to appear and then recognize that data cycle as timeslot 1. Subsequent timeslots 2 through n are detected by the presence of either the "DATA" or "NODATA" character. After timeslot n, there will either be a "PAD" character (in which case the receiver ignores the data), a "SYNC" character or a "DATA" 10-bit data character in which case the receiver knows that timeslot 1 has started again.

Figure 7:
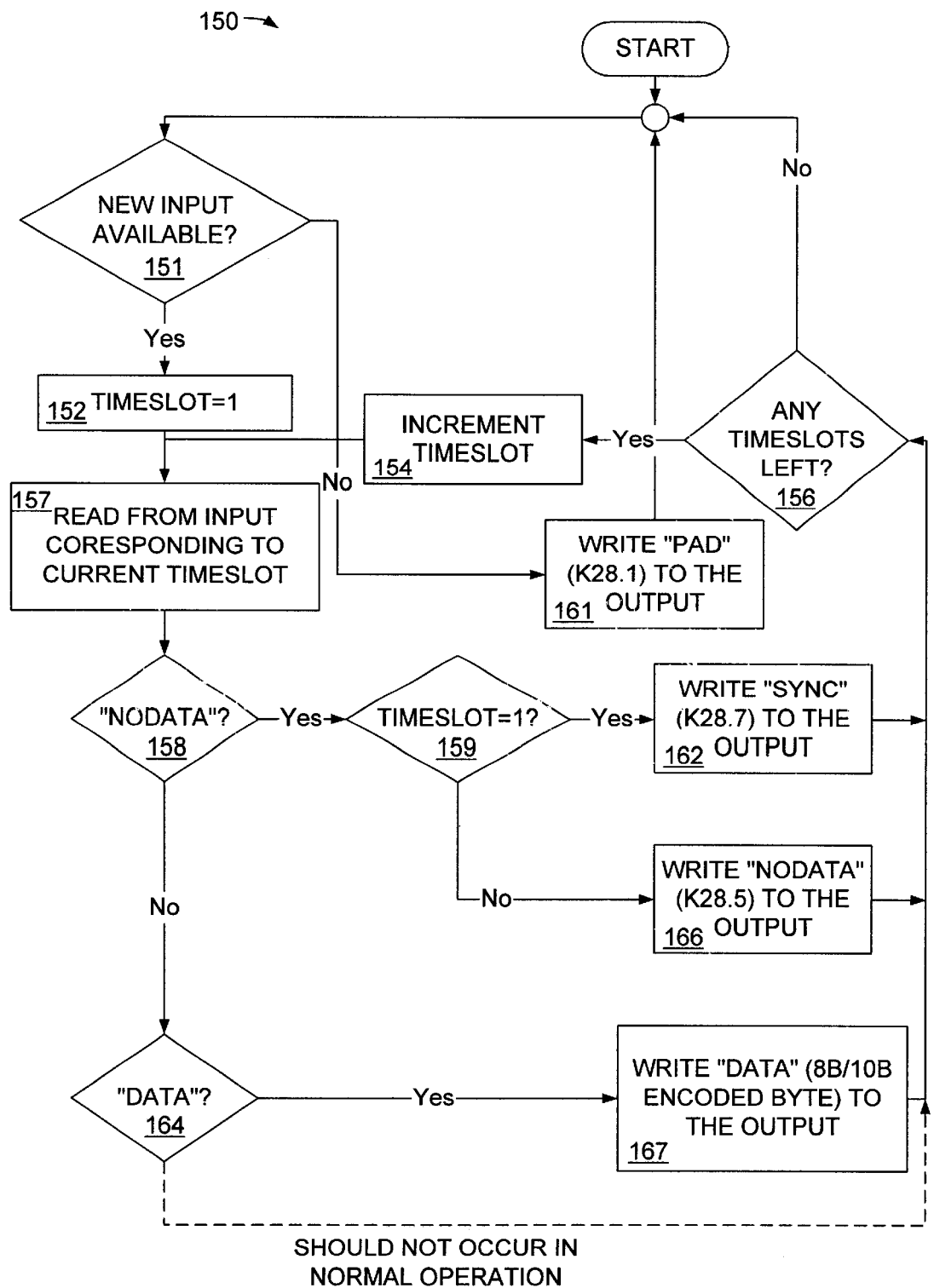
FIG. 7 is a flow chart illustrating the operation of the 8B/10B TDMA encoder of FIG. 1.

FIG. 7 is a flow chart illustrating the operation of the 8B/10B TDMA encoder 47 of FIG. 1. In block 151 it is determined whether any new 8B/10B encoded words are present at the inputs of 8B/10B TDMA encoder 47 (FIG. 1). If any new words are available, then, in block 152, the first timeslot is selected, (i.e., the first input data stream is assigned to timeslot 1). If, in block 151, it is determined that no new input words are yet available, then in block 161 the "PAD" (K28.1) comma character is written into the aggregate output data stream 48 (of FIG. 1).

The 8B/10B TDMA encoder 47 (FIG. 1) takes an arbitrary number of lower data rate 8B/10B inputs and encodes them into one higher data rate 8B/10B output. Given n 8B/10B encoded words arriving per period of time, during that time there must be at least n opportunities to output one of these words so as to have the ability to send out data at least as fast as it is arriving. The 8B/10B TDMA encoder 47 (FIG. 1) provides for situations in which, given an n-input encoder, the output data rate is at least n times the data rate of one input, but not necessarily an exact multiple. The "PAD" character provides filler if the output rate is greater than the sum of the inputs. The exact number of PAD characters that are output after the n timeslots will vary. For example, assume that the output rate is 8.5 times the sum of the inputs, and there are 8 inputs. On the output (aggregate output data stream 48), there is always sufficient time to send out the 8 characters to be output, but it is not possible to send 0.5 characters worth of PAD after the 8 characters of real data. Therefore, a PAD character is sent only about every other time. If the output/input ratio is more complex; for example, 8.5123, or 3.3333, or 9.129028490, the number of PAD characters will continually vary. Therefore, after the n words are sent the system sends PAD characters on every output clock cycle until a fresh new batch of data words appear on the inputs.

In block 157 the 8B/10B TDMA encoder 47 reads from the input corresponding to the current timeslot. Next, in block 158, it is determined whether the input character is "NODATA." If the input character is the "NODATA" comma character, then, in block 159, it is determined whether the character has been read from the first timeslot (i.e., whether "NODATA" has been read from the first input). If, in block 159, it is determined that the current timeslot is the first timeslot, then, in accordance with an aspect of the invention, the "SYNC" (K28.7) character is written into the corresponding first timeslot of the aggregate output data stream 48. If, however, the current timeslot is not the first timeslot, the "NODATA" (K28.5) character is written, as is, to the corresponding timeslot of the aggregate output data stream 48.

If, in block 158, it is determined that the input character is not "NODATA," then, in block 164, it is determined whether the input character is normal 8B/10B encoded data. If so, then in block 167 the data (the 8B/10B encoded byte) are written, as is, to the corresponding timeslot of aggregate output data stream 48. After the SYNC, NODATA, or DATA words are written to the aggregate output data stream 48, in block 156 it is determined whether the encoder has written all n timeslots. If there are no more timeslots left then the process returns to block 151. If, however, in block 156, it is determined that not all n timeslots have been written, then, in block 154, the timeslot is incremented and the process returns to block 157.

Figure 8:
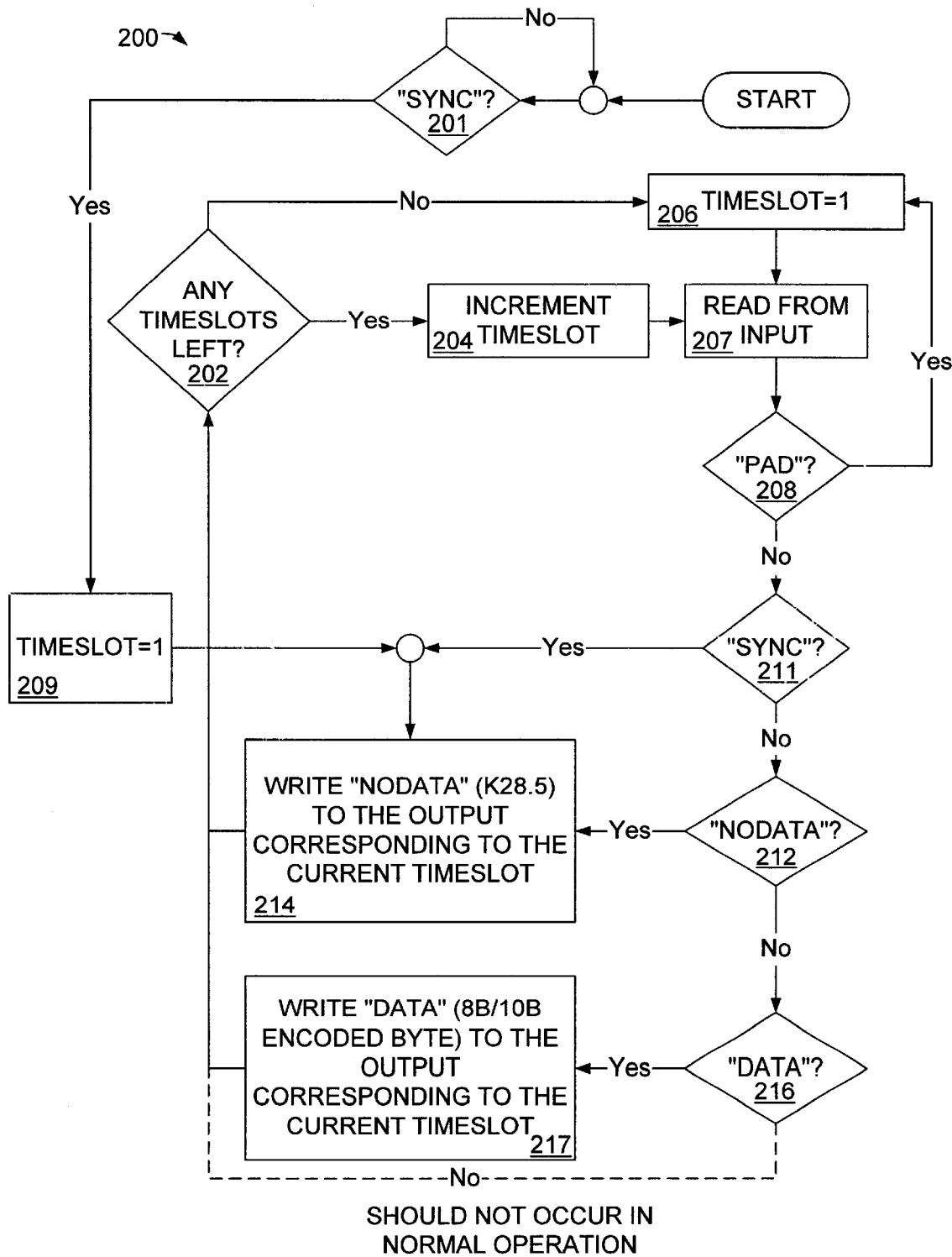
FIG. 8 is a flow chart illustrating the operation of the 8B/10B TDMA decoder of FIG. 1.
Figure 6:
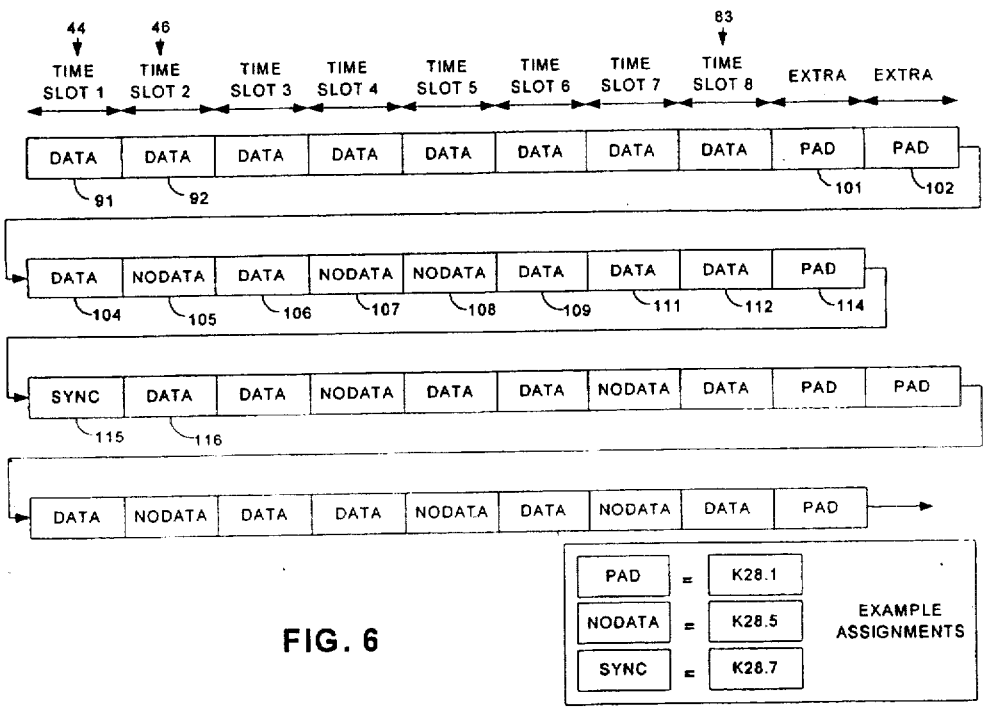
Figure 7:
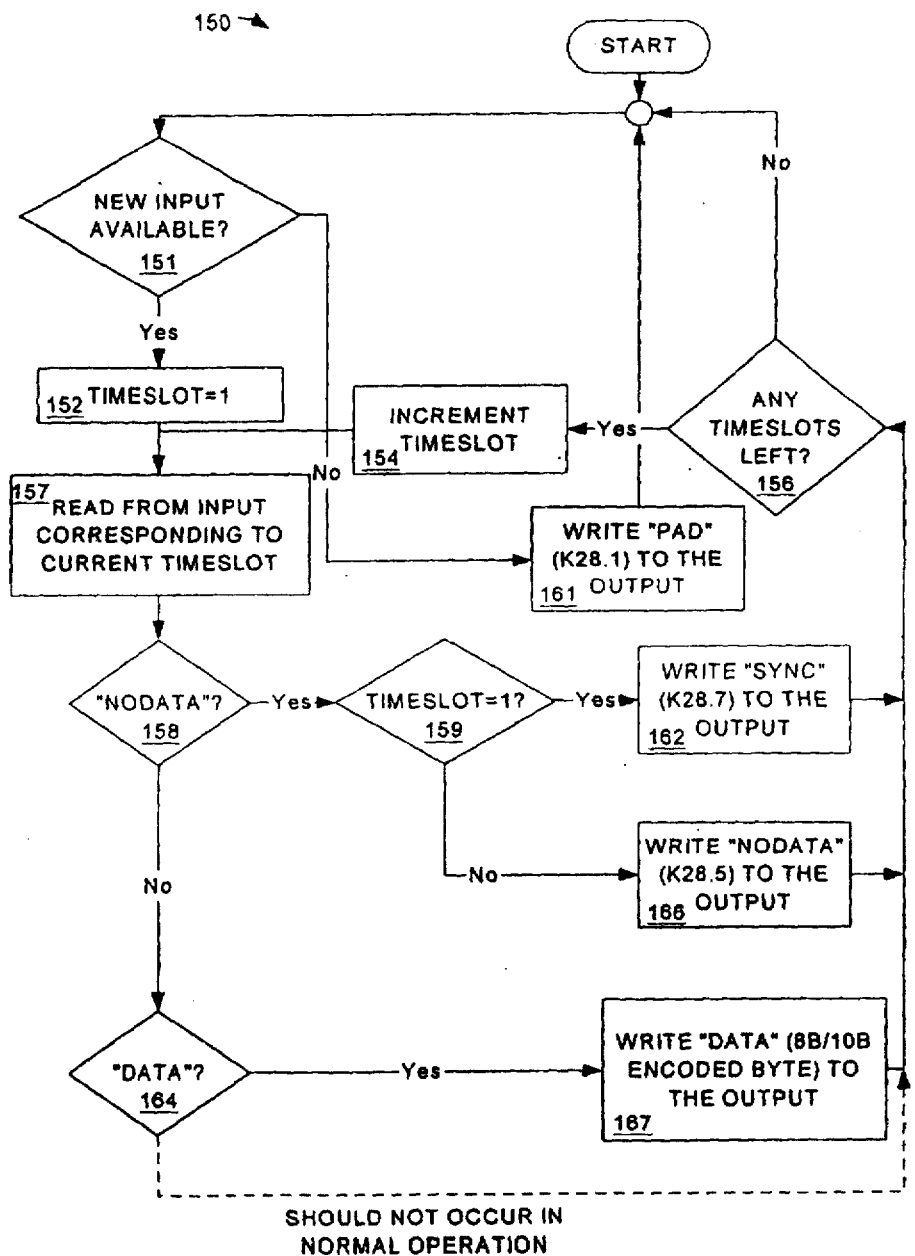

FIG. 8 is a flow chart illustrating the operation of the 8B/10B TDMA decoder 49 of FIG. 1. In order for the decoder to first synchronize to the input stream, the decoder awaits the arrival of the first "SYNC" character. Detecting the "SYNC" character indicates that this character corresponds to the first timeslot. In block 201, it is determined whether the received character is the "SYNC" character. If the character is not the "SYNC" character, then the process returns to block 201 to await the arrival of the "SYNC" character. If, in block 201, it is determined that the received character is the SYNC character, then the receiver knows that the character corresponds to the first timeslot, and, in block 209, the timeslot is set to 1. The receiver then proceeds to block 214, where a "NODATA" character is written to the output port corresponding to the current timeslot, which is, in this case, the first output. The decoder then proceeds to block 202.

In block 202, it is determined whether all the n timeslots that correspond to the n outputs have been processed. If all n timeslots have been processed (i.e., no timeslots left to process), the timeslot is once again reset to 1 in block 206 to be ready for the next batch of n timeslots. The operation of the TDMA decoder 49 then proceeds to block 207. If however, not all n timeslots have been processed (i.e., timeslots are left), the timeslot is incremented in block 204, and then the TDMA decoder 49 proceeds to block 207.

In block 207 the TDMA decoder 49 reads from the input. In block 208 it is determined whether the input is a "PAD" character. If the input is a "PAD" character, then the process goes to block 206. If, in block 208, it is determined that the character is not a "PAD" character, then in block 211 it is determined whether the character is a "SYNC" character. If the character is a "SYNC" character, then the process proceeds to block 214.

If, in block 211, it is determined that the character is not a "SYNC" character, then in block 212 it is determined whether the character is a "NODATA" character. If the character is a "NODATA" character, then the process proceeds to block 214. If, in block 212, it is determined that the character was not a NODATA character, then in block 216, it is determined whether the character was normal 8B/10B encoded data. If the character was normal 8B/10B encoded data, then, in block 217, the 8B/10B encoded byte data is written, as is, to the output corresponding to the current timeslot.

Many variations and modifications may be made to the above-described embodiment(s) of the invention without departing substantially from the scope and principles of the invention. For example, more or fewer input transport streams may be combined using the principles of the invention depending upon the application. All such modifications and variations are intended to be included herein within the scope of the present invention.

Therefore, having thus described the invention, at least the following is claimed:

1. A method for combining a plurality of data streams into an aggregate data stream, the method comprising the steps of:
   encoding a first plurality of 8 bit data words from a first data stream into a first plurality of corresponding 10 bit data words in which each 10 bit data word represents a respective 8 bit data word from said first data stream;
   encoding a second plurality of 8 bit data words from a second data stream into a second plurality of corresponding 10 bit data words in which each 10 bit data word represents a respective 8 bit data word from said second data stream;
   combining said first plurality of corresponding 10 bit data words and said second plurality of corresponding 10 bit data words into an aggregate output stream, said aggregate output stream divided into a plurality of timeslots;
   encoding a plurality of 10 bit words into a corresponding plurality of special characters that do not correspond to any of said first or second plurality of 8 bit data words;
   periodically inserting said special characters into said aggregate output stream; and
   inserting a first special character into a first of said plurality of timeslots, said first special character allowing a receiver to synchronize to said aggregate output stream.

2. The method of claim 1, wherein said first data stream and said second data stream are digital video broadcast-asynchronous serial interface (DVB-ASI) video streams.

3. The method of claim 1, further comprising the step of inserting a second special character into said aggregate output stream if no 10-bit data word is available.

4. The method of claim 3, wherein said second special character is a no data character.

5. The method of claim 1, further comprising the step of inserting a third special character into said aggregate output stream if any of said plurality of timeslots are available after inserting said first and second plurality of 10 bit data words.

6. The method of claim 5, wherein said third special character is a padding character.

7. The method of claim 1, wherein said first special character is a synchronization character.

8. An apparatus for combining a plurality of data streams into an aggregate data stream, comprising:
   an encoder for combining a first plurality of 10 bit data words and a second plurality of 10 bit data words into an aggregate output stream, said aggregate output stream divided into a plurality of timeslots;
   said encoder also encoding a plurality of 10 bit words into a corresponding plurality of special characters that do not correspond to any of said first or second plurality of 10 bit data words;
   said encoder also periodically inserting said special characters into said aggregate output stream; and
   said encoder also inserting a first special character into a first of said plurality of timeslots, said first special character allowing a receiver to synchronize to said aggregate output stream.

9. The apparatus of claim 8, wherein said first plurality of 10 bit data words and said second plurality of 10 bit data words comprise digital video broadcast-asynchronous serial interface (DVB-ASI) communication channels.

10. The apparatus of claim 8, wherein said encoder inserts a second special character into said aggregate output stream if no 10-bit data word is available.

11. The apparatus of claim 10, wherein said second special character is a no data character.

12. The apparatus of claim 8, wherein said encoder inserts a third special character into said aggregate output stream if any of said plurality of timeslots are available after inserting said first and second plurality of 10 bit data words.

13. The apparatus of claim 11, wherein said third special character is a padding character.

14. The apparatus of claim 8, wherein said first special character is a synchronization character.

15. An apparatus for combining a plurality of data streams into an aggregate data stream, comprising:
   means for encoding a first plurality of 8 bit data words from a first data stream into a first plurality of corresponding 10 bit data words in which each 10 bit data word represents a respective 8 bit data word from said first data stream;
   means for encoding a second plurality of 8 bit data words from a second data stream into a second plurality of corresponding 10 bit data words in which each 10 bit data word represents a respective 8 bit data word from said second data stream;
   means for combining said first plurality of corresponding 10 bit data words and said second plurality of corresponding 10 bit data words into an aggregate output stream, said aggregate output stream divided into a plurality of timeslots;
   means for encoding a plurality of 10 bit words into a corresponding plurality of special characters that do not correspond to any of said first or second plurality of 8 bit data words;

means for periodically inserting said special characters into said aggregate output stream; and means for inserting a first special character into a first of said plurality of timeslots, said first special character allowing a receiver to synchronize to said aggregate output stream.

16. The apparatus of claim 15, wherein said first data stream and said second data stream are digital video broadcast-asynchronous serial interface (DVB-ASI) video streams.

17. The apparatus of claim 15, further comprising means for inserting a second special character into said aggregate output stream if no 10-bit data word is available.

18. The apparatus of claim 17, wherein said second special character is a no data character.

19. The apparatus of claim 15, further comprising means for inserting a third special character into said aggregate output stream if any of said plurality of timeslots are available after inserting said first and second plurality of 10 bit data words.

20. The apparatus of claim 18, wherein said third special character is a padding character.

21. The apparatus of claim 15, wherein said first special character is a synchronization character.

22. A computer readable medium having a program for combining a plurality of data streams into an aggregate data stream, the program comprising logic for performing the steps of:

encoding a first plurality of 8 bit data words from a first data stream into a first plurality of corresponding 10 bit data words in which each 10 bit data word represents a respective 8 bit data word from said first data stream;

encoding a second plurality of 8 bit data words from a second data stream into a second plurality of corresponding 10 bit data words in which each 10 bit data word represents a respective 8 bit data word from said second data stream;

combining said first plurality of corresponding 10 bit data words and said second plurality of corresponding 10 bit data words into an aggregate output stream, said aggregate output stream divided into a plurality of timeslots;

encoding a plurality of 10 bit words into a corresponding plurality of special characters that do not correspond to any of said first or second plurality of 8 bit data words;

periodically inserting said special characters into said aggregate output stream; and inserting a first special character into a first of said plurality of timeslots, said first special character allowing a receiver to synchronize to said aggregate output stream.

23. The program of claim 22, wherein said first data stream and said second data stream are digital video broadcast-asynchronous serial interface (DVB-ASI) video streams.

24. The program of claim 22, further comprising logic for performing the step of inserting a second special character into said aggregate output stream if no 10-bit data word is available.

25. The program of claim 24, wherein said second special character is a no data character.

26. The program of claim 22, further comprising logic for performing the step of inserting a third special character into said aggregate output stream if any of said plurality of timeslots are available after inserting said first and second plurality of 10 bit data words.

27. The program of claim 26, wherein said third special character is a padding character.

28. The program of claim 22, wherein said first special character is a synchronization character.

* * * * *

UNITED STATES PATENT AND TRADEMARK OFFICE
CERTIFICATE OF CORRECTION

PATENT NO. : 6,323,789 B1
DATED : November 27, 2001
INVENTOR(S) : Lawrence

Page 1 of 3

It is certified that error appears in the above-identified patent and that said Letters Patent is hereby corrected as shown below:

Drawings,
Delete drawing sheets 5 & 6, and substitute therefor the drawing sheets consisting of Figs. 6 & 7, as shown on the attached pages.

Signed and Sealed this

Twenty-eighth Day of May, 2002

Attest:

JAMES E. ROGAN
Attesting Officer
Director of the United States Patent and Trademark Office